United States Patent [19]

Takagi et al.

[11] Patent Number: 5,082,593

[45] Date of Patent: Jan. 21, 1992

[54] NON-REDUCTION AGENT FOR DIELECTRIC CERAMICS

[75] Inventors: Hiroshi Takagi; Yoshiaki Mori; Yukio Sakabe, all of Nagaokakyo, Japan

[73] Assignee: Murata Manufacturing Co., Ltd., Japan

[21] Appl. No.: 395,603

[22] Filed: Aug. 18, 1989

[30] Foreign Application Priority Data

Aug. 19, 1988 [JP] Japan .................. 63-207174

[51] Int. Cl.$^5$ .............................................. H01G 4/12
[52] U.S. Cl. .................................. 252/397; 501/134; 361/321
[58] Field of Search ................... 501/134; 252/394; 361/321

[56] References Cited

U.S. PATENT DOCUMENTS

| | | | |
|---|---|---|---|
| 3,035,928 | 5/1962 | Searight | 501/34 |
| 3,193,401 | 7/1965 | Alexander | 501/34 |
| 3,600,652 | 8/1971 | Riley | 361/321 |
| 4,626,393 | 12/1986 | Wada et al. | 361/321 X |
| 4,700,265 | 10/1987 | Kishi et al. | 361/321 |
| 4,723,193 | 2/1988 | Chazono et al. | 361/321 |
| 4,809,131 | 2/1989 | Chazono et al. | 361/321 |
| 4,927,711 | 5/1990 | Francis et al. | 361/397 X |

FOREIGN PATENT DOCUMENTS 0039408 2/1990 Japan .

Primary Examiner—Deborah L. Kyle
Assistant Examiner—Valerie Fee
Attorney, Agent, or Firm—Ostrolenk, Faber, Gerb & Soffen

[57] ABSTRACT

A non-reduction agent for dielectric ceramics is composed of $a(MnO+RO)$ and $(1-a)(BO_{3/2}+SiO_2)$, or of $b(LiO_{\frac{1}{2}}+RO)$ and $(1-b)(BO_{3/2}+SiO_2)$. Here, R is at least one kind selected from among Mg, Ca, Sr and Ba. In these compositions, a is within a range of $0.01 \leq a \leq 0.90$ (Mol ratio), and b is within a range of $0.01 \leq b \leq 0.80$ (Mol ratio). These non-reduction agents for dielectric ceramics are added to dielectric ceramic materials containing lead oxide, for example, and used as materials for capacitors. These dielectric ceramics become hard to be reduced even when fired in reducing atmospheres.

4 Claims, No Drawings

NON-REDUCTION AGENT FOR DIELECTRIC CERAMICS

BACKGROUND OF THE INVENTION

1. Field of the Invention

The present invention relates to a non-reduction agent for dielectric ceramics, and specifically relates to a non-reduction agent for dielectric ceramics containing lead oxide.

2. Description of Prior Art

Conventionally, dielectric ceramics containing lead oxide have been used as dielectric materials to manufacture monolithic capacitors. Such dielectric ceramics containing lead oxide can reach a comparatively high dielectric constant, and can be fired at low temperatures. But the insulating characteristics of the dielectric ceramics containing lead oxide deteriorates when reduced and, therefore, need to be fired in an oxidizing atmosphere. For this reason the Ag-Pd noble metal series are used as materials for the inner electrodes of the monolithic capacitor because they are stable even when fired in an oxidizing atmosphere.

However, the Ag-Pb noble metals series used for the electrodes are undesirable for a number of reasons. They are expensive which raises the cost of the monolithic capacitor, they deteriorate the insulating characteristics of the dielectric ceramics due to the migration of Ag, and the equivalent series resistance may increase because of a low dielectric constant. For these reasons, the use of Cu or a Cu series alloy has been considered because they cause less problems than the Ag-Pb nobel metals series. However, the electrical characteristics of the Cu and Cu series alloys easily deteriorate due to oxidation and, therefore, cannot be fired in an oxidizing atmosphere.

SUMMARY OF THE INVENTION

Therefore, a principal object of the present invention is to provide a non-reduction agent for dielectric ceramics which prevent deterioration of the electrical characteristics of dielectric ceramics containing lead oxide even when the dielectric ceramics are fired in a reducing atmosphere.

The present invention is a non-reduction agent for dielectric ceramics which is composed of a(MnO+RO) and (1−a) ($BO_{3/2}$+$SiO_2$) wherein R is selected from the group consisting of Mg, Ca, Sr and Ba, and wherein a is in a range of $0.01 \leq a \leq 0.90$ (Mol ratio).

The present invention is also a non-reduction agent for dielectric ceramics which is composed of b($LiO_{\frac{1}{2}}$+RO) and (1−b) ($BO_{3/2}$+$SiO_2$) wherein R is selected from the group consisting of Mg, Ca, Sr and Ba, and wherein b is in a range of $0.01 \leq b \leq 0.80$ (Mol ratio).

In accordance with the present invention, a non-reduction agent for dielectric ceramics is added to a dielectric ceramic material containing lead oxide to prevent reduction of the dielectric ceramic and to prevent deterioration of the electrical characteristics of the dielectric ceramic even when fired in a reducing atmosphere. This allows Cu or Cu series alloys to be used for the inner electrodes, thereby, reducing the cost of the monolithic capacitor. Also, by using Cu or Cu series alloys as materials for the inner electrode, deterioration of electrical characteristics due to the migration of Ag, as is the case with Ag-Pd nobel metals series, is prevented. Further, deterioration in the equivalent series resistance is prevented due to a high conductivity.

These objects and other objects, features and advantages of the present invention will become more apparent from the following detailed description of the embodiments of the present invention.

DESCRIPTION OF THE PREFERRED EMBODIMENTS

A non-reduction agent for dielectric ceramics in accordance with the present invention is added to a main component of dielectric ceramic material at a predetermined ratio, mixed therewith, thereafter made into a green capacitor unit and then fired to obtain a monolithic capacitor. The non-reduction agent may be added individually to the main component of dielectric ceramic material, but it is also possible that the non-reduction agent can be blended in advance. This is accomplished by producing a powder by heat-treating, or by producing a vitrified material by melting at higher temperatures, pulverizing the material, and then mixing it with the main component.

The range of composition of the non-reduction agent is limited because when the non-reduction agent is composed of a (MnO+RO) and (1−a) ($BO_{3/2}$+$SiO_2$), and (MnO+RO) is less than 0.01 (Mol Ratio) or exceeds 0.90 (Mol ratio), the insulating resistance of the dielectric ceramic containing lead oxide and including the non-reduction agent becomes less than $10^{10}$ Ωcm, and no non-reducing properties are realized.

Similarly, when the non-reduction agent is composed of b($LiO_{\frac{1}{2}}$+RO) and (1−b) ($BO_{3/2}$+$SiO_2$), and ($LiO_{\frac{1}{2}}$+RO) is less than 0.01 (Mol ratio) or exceeds 0.80 (Mol ratio), the insulating resistance of the dielectric ceramics containing lead oxide and including the non-reduction agent becomes less than $10^{10}$ Ωcm, and no non-reducing properties are realized.

The ratio of the non-reduction agent to the main component of dielectric ceramic material differs depending on the main component of the dielectric ceramic material, but is in a range of 0.05–25.0 weight % of the whole. This is because when the ratio is less that 0.05 weight %, no non-reducing properties are realized. When the ratio exceeds 25.0 weight %, the dielectric characteristics are remarkably spoiled.

EXPERIMENTAL EXAMPLE 1

A dielectric powder containing lead oxide was prepared by first weighing $Pb_3O_4$, $MgCO_3$, $Nb_2O_5$, $TiO_2$ and ZnO according to a composition of 72Pb ($Mb_{\frac{1}{3}}$ $Nb_{170}$) $O_3$, 25Pb ($Zn_{\frac{1}{3}}$ $Nb_{\frac{2}{3}}$) $O_3$ and 3$PbTiO_3$ (Mol ratio). The composition was then blended by a ball mill for 12 hours and dried by evaporation to obtain a blended powder. The blended powder was then fired at 800° C. for two hours, and roughly pulverized so as to pass through a 200-mesh sieve.

To prepare a non-reduction agent for dielectric ceramics, MnO, $MgCO_3$, $CaCO_3$, $SrCO_3$, $BaCO_3$, $B_2O_3$ and $SiO_2$ were blended according to the compositions as shown in Table 1. The mixture was then placed in an aluminum crucible, left for one hour at a temperature of 1200° C., vitrified by quick cooling, and pulverized so as to pass through a 200-mesh sieve.

The non-reduction agent was then added to a dielectric ceramic material containing lead oxide according to the ratios as shown in Table 2. A binder of polyvinylbutyral series and an organic solvent were added thereto and this was wet-blended for 24 hours by a ball mill to obtain a slurry. The composition of the non-reduction agents as shown by each sample number in Table 2 corresponds to the composition as shown by the same sample number in Table 1.

The slurry was formed into green sheets of 50 μm in thickness by the doctor blade method. Copper electrode paste was then printed on the sheets by the screen printing method, and after drying, the sheets were stacked to become opposite electrodes, and formed in one piece by thermo-pressure bonding. Individual capacitor units were then cut out from this laminated block. Cu electrode paste was also coated on the end surfaces of the capacitor units to form an external electrode. The green units thus obtained were put into an electric furnace regulated to a reducing atmosphere using a mixture of $N_2$, $H_2$ and $H_2O$ gasses, and was fired at 1000° C. for three hours to result in a chip-type monolithic capacitor.

The dimensions of the chip-type monolithic capacitor fabricated in this experimental example are as set forth below.

External dimensions:
Width 4.8 mm × Length 5.6 mm × Thickness 1.2 mm
Thickness of effective dielectric layer (t) : 32 μm
Number of effective dielectric layers (N) : 17
Opposite electrode area (S) : 21.5 mm$^2$ The electrostatic capacitance of the obtained chip-type capacitor (C) was measured by an automatic bridge of 1 KHz–1V, and the dielectric constant ($\epsilon$) was evaluated by the following equation:

$$\epsilon = (113 \times C \times t)/(S \times N)$$
$$= 8.3 \times 10^{-3} \times C$$

Furthermore, a voltage of 50V was applied for two minutes using a high-voltage megger, and thereafter the insulating resistance of the chip-type monolithic capacitor was measured. The results are shown in Table 2.

In Table 1 and Table 2, the mark (*) affixed to the sample number shows that the sample is out of the scope of the present invention. The remaining samples are within the scope of the present invention.

In addition, for purposes of comparison, a sample dielectric material not containing a non-reduction agent (example for comparison 1), a sample dielectric material containing 0.04 weight % of a non-reduction agent having the composition ratio of the sample number 8 in Table 1 (sample for comparison 2), and a sample dielectric material containing 25.5 weight % of the same non-reduction agent as the sample for comparison 2 (sample for comparison 3) were prepared, and formed into chip-type monolithic capacitors and measured by the methods described above. The results are shown in Table 2.

As can be understood from Table 1 and Table 2, when (MnO+RO) which is a component of the non-reduction agent for dielectric ceramics is less than 0.01 (Mol ratio) or exceeds 0.90 (Mol ratio), the insulating resistance becomes less than $10^{10}$ m Ωcm, and no non-reducing properties are realized.

Also the weight % of the non-reduction agent with respect to the dielectric material containing lead oxide and including the non-reduction agent is desirably within a range of 0.05-25.0 weight %. As shown in the examples for comparison 1 and 2 of Table 2, when the weight % of the non-reduction agent is less than 0.05 weight %, the insulating resistance becomes less than $10^{10}$ Ωcm, and no non-reducing properties are realized.

When the weight % of the non-reduction agent exceeds 25.0 weight % as shown in the example for comparison 3, the dielectric constant becomes less than 4000. This results in the dielectric characteristics becoming remarkably spoiled.

EXPERIMENTAL EXAMPLE 2

To prepare a non-reduction agent for dielectric ceramics, $LiCO_3$, $MgCO_3$, $CaCO_3$, $SrCO_3$, $BaCO_3$, $B_2O_3$ and $SiO_2$ were blended according to the compositions as shown in Table 3. The mixture was put into an aluminum crucible, left for one hour at a temperature of 1200° C., vitrified by quick cooling, and pulverized so as to pass through a 200-mesh sieve.

Chip-type monolithic capacitors using this non-reduction agent for dielectric ceramics were prepared and measured in the same way as the chip-type monolithic capacitors of experimental example 1. The results of the measurements are shown in Table 4.

In addition, for purposes of comparison, a sample dielectric material not containing a non-reduction agent (example for comparison 1), a sample dielectric material containing 0.04 weight % of a non-reduction agent having the composition ratio of sample number 10 in Table 3 (example for comparison 2) and a sample dielectric material containing 25.5 weight % of the same non-reduction agent as the example for comparison 2 (example for comparison 3) were prepared, and formed into chip-type monolithic capacitors and measured by the methods described above with regard to experimental example 1. The results of the measurements are shown in Table 4.

As can be understood from Table 3 and Table 4, when ($LiO_{\frac{1}{2}}$+RO), which is a component of the non-reduction agent for dielectric ceramic, is less than 0.01 (Mol ratio) or exceeds 0.80 (Mol ratio), the insulating resistance becomes less than $10^{10}$ Ωcm, and no non-reducing properties are realized.

Also, the weight % of the non-reduction agent with regard to the dielectric material containing lead oxide and the non-reduction agent is desirably within a range of 0.05-25.0 weight %. When this ratio becomes less than 0.05 weight %, as shown in the examples for comparison 1 and 2 of Table 4, the insulating resistance becomes less than $10^{10}$ Ωcm, and no non-reducing properties are realized. When the ratio of addition of this anti-reduction agent exceeds 25.0 weight %, as shown in the example for comparison 3 of Table 4, the dielectric constant becomes less than 4000. This results in the dielectric characteristics becoming remarkably spoiled.

In each embodiment as mentioned above, the non-reduction agent for dielectric ceramics of the present invention is added to a dielectric ceramic material containing lead oxide composed of $Pb(Mg_{\frac{1}{3}} Nb_{\frac{2}{3}})O_3$, $Pb(Zn_{\frac{1}{3}} Nb_{\frac{2}{3}})O_3$ and $PbTiO_3$. However, a reduction in the insulating resistance can be prevented in a like manner by adding the non-reduction agent of the present invention to other dielectric ceramic materials containing lead oxide as shown in Table 5 that are fired in a reducing atmosphere. For samples wherein no non-reduction agent was added, the insulating characteristics were spoiled, and the dielectric characteristics were remarkably spoiled.

It is needless to say that the non-reduction agent for the dielectric ceramics of the present invention is not limited to the use of dielectric ceramics containing lead oxide as exemplified above, but can well be used for dielectric ceramics not containing lead oxide.

Although the present invention has been described in detail, it is clearly understood that the same is by way of example only and is not to be taken by way of limitation, the spirit and scope of the present invention being limited only by the terms of the appended claims.

TABLE 1

| Sample No. | Composition of Non-Reduction Agent (Mol Ratio) | | | | | | |
|---|---|---|---|---|---|---|---|
| | MnO | MgO | CaO | SrO | BaO | $BO_{3/2}$ | $SiO_2$ |
| 1* | 0.005 | 0 | 0 | 0 | 0 | 0.5 | 0.495 |
| 2* | 0 | 0 | 0 | 0 | 0.005 | 0.5 | 0.495 |
| 3* | 0.0025 | 0 | 0.0025 | 0 | 0 | 0.5 | 0.495 |
| 4 | 0.01 | 0 | 0 | 0 | 0 | 0.5 | 0.49 |
| 5 | 0 | 0 | 0 | 0.01 | 0 | 0.5 | 0.49 |
| 6 | 0.005 | 0.005 | 0 | 0 | 0 | 0.5 | 0.49 |
| 7 | 0.05 | 0.05 | 0.05 | 0.05 | 0.05 | 0.25 | 0.5 |
| 8 | 0.2 | 0.05 | 0.05 | 0.05 | 0.05 | 0.3 | 0.3 |
| 9 | 0.2 | 0.05 | 0.05 | 0.05 | 0.05 | 0.3 | 0.3 |
| 10 | 0.2 | 0.05 | 0.05 | 0.05 | 0.05 | 0.3 | 0.3 |
| 11 | 0.2 | 0.05 | 0.05 | 0.05 | 0.05 | 0.3 | 0.3 |
| 12 | 0.3 | 0.1 | 0 | 0 | 0 | 0.3 | 0.3 |
| 13 | 0.3 | 0 | 0.1 | 0 | 0 | 0.3 | 0.3 |
| 14 | 0.3 | 0 | 0 | 0.1 | 0 | 0.3 | 0.3 |
| 15 | 0.3 | 0 | 0 | 0 | 0.1 | 0.3 | 0.3 |
| 16 | 0.5 | 0.1 | 0.1 | 0.1 | 0.1 | 0.05 | 0.05 |
| 17* | 0.51 | 0.1 | 0.1 | 0.1 | 0.1 | 0.05 | 0.04 |
| 18* | 0.31 | 0.15 | 0.15 | 0.15 | 0.15 | 0.04 | 0.05 |

TABLE 2

| Sample No. | Dielectric Powder of Pb Series (weight %) | Non-Reduction Agent (weight %) | Electric Characteristics | |
|---|---|---|---|---|
| | | | Dielectric Constant ($\epsilon$) | Insulation Resistance ($\Omega$cm) |
| 1* | 98 | 2 | — | below $10^{10}$ |
| 2* | 98 | 2 | — | below $10^{10}$ |
| 3* | 98 | 2 | — | below $10^{10}$ |
| 4 | 98 | 2 | 11500 | above $10^{10}$ |
| 5 | 98 | 2 | 12000 | above $10^{10}$ |
| 6 | 98 | 2 | 12500 | above $10^{10}$ |
| 7 | 98 | 2 | 12300 | above $10^{10}$ |
| 8 | 98 | 2 | 12000 | above $10^{10}$ |
| 9 | 99.95 | 0.05 | 14500 | above $10^{10}$ |
| 10 | 90 | 10 | 8800 | above $10^{10}$ |
| 11 | 75 | 25 | 4000 | above $10^{10}$ |
| 12 | 98 | 2 | 11800 | above $10^{10}$ |
| 13 | 98 | 2 | 12500 | above $10^{10}$ |
| 14 | 98 | 2 | 12200 | above $10^{10}$ |
| 15 | 98 | 2 | 12500 | above $10^{10}$ |
| 16 | 98 | 2 | 10200 | above $10^{10}$ |
| 17* | 98 | 2 | — | below $10^{10}$ |
| 18* | 98 | 2 | — | below $10^{10}$ |
| Sample For Comparison 1 | 100 | 0 | — | below $10^{10}$ |
| Sample For Comparison 2 | 99.96 | 0.04 | — | below $10^{10}$ |
| Sample For Comparison 3 | 74.5 | 25.5 | 2500 | above $10^{10}$ |

TABLE 3

| Sample No. | Composition of Non-Reduction Agent (Mol Ratio) | | | | | | |
|---|---|---|---|---|---|---|---|
| | $LiO_{\frac{1}{2}}$ | MgO | CaO | SrO | BaO | $BO_{3/2}$ | $SiO_2$ |
| 1* | 0.005 | 0 | 0 | 0 | 0 | 0.5 | 0.495 |
| 2* | 0 | 0 | 0 | 0 | 0.005 | 0.5 | 0.495 |
| 3* | 0.0025 | 0 | 0.0025 | 0 | 0 | 0.5 | 0.495 |
| 4 | 0.01 | 0 | 0 | 0 | 0 | 0.5 | 0.49 |
| 5 | 0 | 0 | 0 | 0.01 | 0 | 0.5 | 0.49 |
| 6 | 0.005 | 0.005 | 0 | 0 | 0 | 0.5 | 0.49 |
| 7 | 0.05 | 0.05 | 0.05 | 0.05 | 0.05 | 0.25 | 0.5 |
| 8 | 0.05 | 0.05 | 0.05 | 0.05 | 0.05 | 0.75 | 0 |
| 9 | 0.05 | 0.05 | 0.05 | 0.05 | 0.05 | 0 | 0.75 |
| 10 | 0.2 | 0.05 | 0.05 | 0.05 | 0.05 | 0.3 | 0.3 |
| 11 | 0.2 | 0.05 | 0.05 | 0.05 | 0.05 | 0.3 | 0.3 |
| 12 | 0.2 | 0.05 | 0.05 | 0.05 | 0.05 | 0.3 | 0.3 |
| 13 | 0.2 | 0.05 | 0.05 | 0.05 | 0.05 | 0.3 | 0.3 |
| 14 | 0.3 | 0.1 | 0 | 0 | 0 | 0.3 | 0.3 |
| 15 | 0.3 | 0 | 0.1 | 0 | 0 | 0.3 | 0.3 |
| 16 | 0.3 | 0 | 0 | 0.1 | 0 | 0.3 | 0.3 |
| 17 | 0.3 | 0 | 0 | 0 | 0.1 | 0.3 | 0.3 |
| 18 | 0.4 | 0.1 | 0.1 | 0.1 | 0.1 | 0.1 | 0.1 |
| 19* | 0.41 | 0.1 | 0.1 | 0.1 | 0.1 | 0.1 | 0.09 |
| 20* | 0.21 | 0.15 | 0.15 | 0.15 | 0.15 | 0.09 | 0.1 |

TABLE 4

| Sample No. | Dielectric Powder of Pb Series (weight %) | Non-Reduction Agent (weight %) | Electric Characteristics | |
|---|---|---|---|---|
| | | | Dielectric Constant ($\epsilon$) | Insulation Resistance ($\Omega$cm) |
| 1* | 98 | 2 | — | below $10^{10}$ |
| 2* | 98 | 2 | — | below $10^{10}$ |
| 3* | 98 | 2 | — | below $10^{10}$ |
| 4 | 98 | 2 | 11500 | above $10^{10}$ |
| 5 | 98 | 2 | 12000 | above $10^{10}$ |
| 6 | 98 | 2 | 12500 | above $10^{10}$ |
| 7 | 98 | 2 | 12500 | above $10^{10}$ |
| 8 | 98 | 2 | 11500 | above $10^{10}$ |
| 9 | 98 | 2 | 10500 | above $10^{10}$ |
| 10 | 98 | 2 | 12000 | above $10^{10}$ |
| 11 | 99.95 | 0.05 | 14500 | above $10^{10}$ |
| 12 | 90 | 10 | 8500 | above $10^{10}$ |
| 13 | 75 | 25 | 4000 | above $10^{10}$ |
| 14 | 98 | 2 | 12000 | above $10^{10}$ |
| 15 | 98 | 2 | 12500 | above $10^{10}$ |
| 16 | 98 | 2 | 12000 | above $10^{10}$ |
| 17 | 98 | 2 | 12500 | above $10^{10}$ |
| 18 | 98 | 2 | 11000 | above $10^{10}$ |
| 19* | 98 | 2 | 11000 | below $10^{10}$ |
| 20* | 98 | 2 | 11000 | below $10^{10}$ |
| Sample For Comparison 1 | 100 | 0 | — | below $10^{10}$ |
| Sample For Comparison 2 | 99.96 | 0.04 | — | below $10^{10}$ |
| Sample For Comparison 3 | 74.5 | 25.5 | 2500 | above $10^{10}$ |

TABLE 5

| Dielectric Ceramics Containing Lead Oxide | Japanese Provisional Publication No. |
|---|---|
| Containing Pb(Mg, Nb)$O_3$ | 25607/1982<br>256959/1986<br>83350/1987 etc. |
| Containing Pb(Mg, W)$O_3$ | 144610/1980<br>135509/1983<br>287510/1987 etc. |
| Containing Pb(Mg, Ta)$O_3$ | 117809/1980 etc. |
| Containing Pb(Zn, Nb)$O_3$ | 27974/1982<br>191555/1986<br>83354/1987 etc. |
| Containing Pb(Zn, W)$O_3$ | 2203/1986<br>83351/1987<br>83353/1987 etc. |
| Containing PbTi$O_3$ | 128409/1986<br>119805/1987<br>119806/1987 etc. |
| Containing Pb(Ni, Nb)$O_3$ | 49661/1983<br>214201/1983 |

TABLE 5-continued

| Dielectric Ceramics Containing Lead Oxide | Japanese Provisional Publication No. |
|---|---|
| Containing (Pb, La)(Zr, Ti)O$_3$ | 105208/1984 etc. 138360/1987 216965/1987 etc. |
| Containing PbO | 82398/1973 59403/1981 76107/1981 37963/1982 etc. |

What is claimed is:

1. A non-reduction agent for dielectric ceramics which is composed of a (MnO+RO) and (1−a) (BO$_{3/2}$+SiO$_2$) wherein R is selected from the group consisting of Mg, Ca, Sr and Ba, wherein a is in a range of $$0.01 \leq a \leq 0.90 \text{ (Mol ratio)}$$

and wherein RO is in a range of 0–0.1 mol, MnO is in a range of 0–0.5 mol, SiO$_2$ is in a range of 0.05–0.49 mol, and BO$_{3/2}$ is in a range of 0.05–0.5 mol, and (MnO+RO)≠0.

2. A dielectric ceramic material including the non-reduction agent of claim 1 wherein the non-reduction agent is included within a range of 0.05–25.0 by weight percent.

3. A non-reduction agent for dielectric ceramics which is composed of b(LiO$_{\frac{1}{2}}$+RO) and (1−b) (BO$_{3/2}$+SiO$_2$) wherein R is selected from the group consisting of Mg, Ca, Sr and Ba, wherein b is in a range of $$0.01 \leq b \leq 0.80 \text{ (Mol ratio)}$$

and wherein RO is in a range of 0–0.1 mol, LiO$_{\frac{1}{2}}$ is in a range of 0–0.4 mol, SiO$_2$ is in a range of 0–0.75 mol, and BO$_{3/2}$ is in a range of 0–0.75 mol, and (LiO$_{\frac{1}{2}}$+RO)≠0.

4. A dielectric ceramic material including the non-reduction agent of claim 3 wherein the non-reduction agent is included within a range of 0.05–25.0 by weight percent.

* * * * *